(12) United States Patent
Hurlbert et al.

(10) Patent No.: US 7,828,302 B2
(45) Date of Patent: Nov. 9, 2010

(54) LATERAL SEALING GASKET AND METHOD

(75) Inventors: David Hurlbert, Ypsilanti, MI (US);
Rob Waters, Hartland, MI (US)

(73) Assignee: Federal-Mogul Corporation,
Southfield, MI (US)

( * ) Notice: Subject to any disclaimer, the term of this patent is extended or adjusted under 35 U.S.C. 154(b) by 432 days.

(21) Appl. No.: 11/839,056

(22) Filed: Aug. 15, 2007

(65) Prior Publication Data
US 2009/0045592 A1 Feb. 19, 2009

(51) Int. Cl.
*F16J 15/02* (2006.01)
(52) U.S. Cl. .................... 277/637; 277/644; 277/647
(58) Field of Classification Search ................ 277/530, 277/566, 609, 616, 628, 637, 644, 647, 312–314
See application file for complete search history.

(56) References Cited

U.S. PATENT DOCUMENTS

| | | | | |
|---|---|---|---|---|
| 1,924,555 | A * | 8/1933 | Hubbard | 277/530 |
| 2,430,836 | A * | 11/1947 | Taylor | 384/16 |
| 2,475,836 | A | 7/1949 | Henricksen et al. | |
| 3,833,228 | A * | 9/1974 | Gilliam, Sr. | 277/530 |
| 3,901,517 | A * | 8/1975 | Heathcott | 277/556 |
| 4,159,828 | A * | 7/1979 | Ostling et al. | 277/500 |
| 4,222,576 | A | 9/1980 | Clements | |
| 4,298,204 | A | 11/1981 | Jinkins | |
| 4,313,609 | A | 2/1982 | Clements | |
| 4,398,731 | A | 8/1983 | Gorman et al. | |
| 5,050,764 | A | 9/1991 | Voss | |
| 5,687,975 | A | 11/1997 | Inciong | |
| 6,561,522 | B1 | 5/2003 | Radelet et al. | |
| 6,691,667 | B2 | 2/2004 | Salameh | |
| 6,868,820 | B2 | 3/2005 | Rehr et al. | |
| 6,962,338 | B2 | 11/2005 | Moidu | |
| 7,004,477 | B2 * | 2/2006 | Sakata et al. | 277/612 |
| 7,029,013 | B2 | 4/2006 | Yajima et al. | |
| 7,441,525 | B2 * | 10/2008 | Jessberger et al. | 123/90.37 |
| 2005/0115532 | A1 | 6/2005 | Schueren | |
| 2005/0193972 | A1 | 9/2005 | vom Stein | |
| 2005/0205033 | A1 | 9/2005 | vom Stein | |
| 2006/0118073 | A1 | 6/2006 | Bauer et al. | |

* cited by examiner

*Primary Examiner*—Vishal Patel
(74) *Attorney, Agent, or Firm*—Robert L. Stearns; Dickinson Wright, PLLC

(57) ABSTRACT

An elongated elastomeric gasket (10) seals a pair of opposing flanges (12, 14) against the passage of liquid without compressing the flanges (12, 14) together. A reinforcing spring (32) is embedded within the elastomeric gasket (10) and is shaped so as to react when deflected by the operation of installing the gasket (10) into an operative position between the flanges (12, 14). A strategically located U-shaped bend (34) formed in the reinforcing spring (32) causes, in a preferred embodiment, contact pressure to be increased between opposed sealing beads at the other end of the gasket. More specifically, lateral contact pressure between a first pair of sealing beads (24) and their associated contact faces (38) is increased as a direct result of the reinforcing spring (32) being displaced during the assembly process. Likewise, lateral contact pressure between a second pair of beads (28) and their respective contact faces (42) is increased in direct response to the lateral displacement of the reinforcing spring (32) in the region of the first beads (24) during assembly.

8 Claims, 5 Drawing Sheets

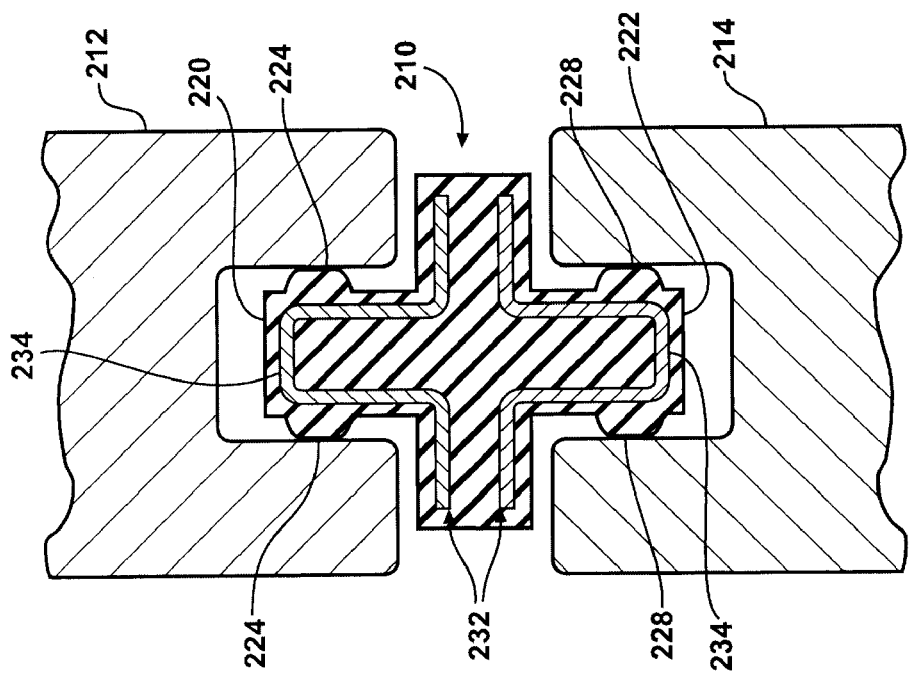
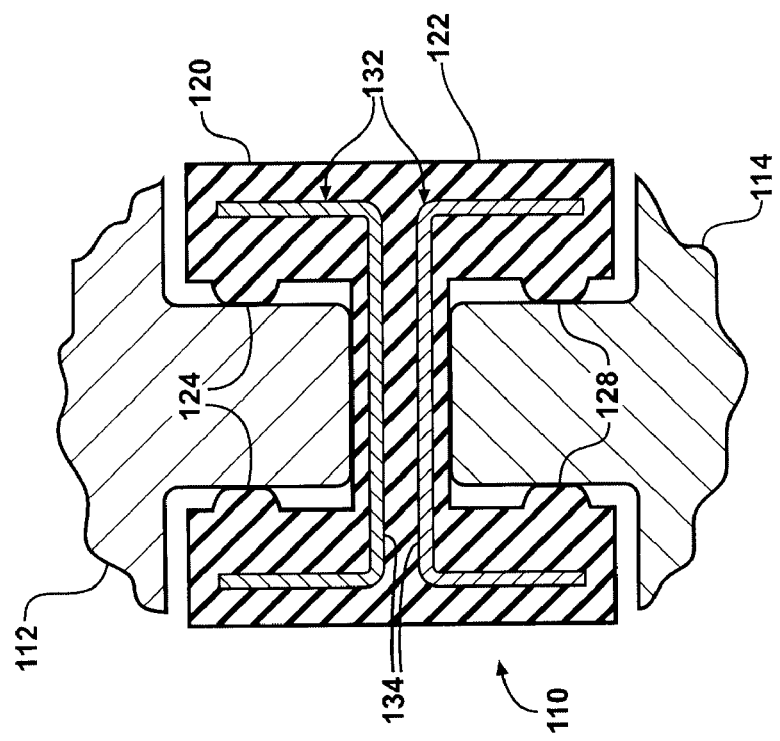

LATERAL SEALING GASKET AND METHOD

CROSS REFERENCE TO RELATED APPLICATIONS

None.

BACKGROUND OF THE INVENTION

1. Field of the Invention

A three-part gasket system for sealing opposing flanges without compressing the flanges together, and more particularly a loose-piece gasket that maintains a liquid impervious seal through self-generated lateral contact pressure exerted on each of the opposing flanges.

2. Related Art

Gaskets are used in a wide variety of sealing applications. Typically, the gasket is compressed between opposing flanges to perfect a fluid impervious seal. The compression load is usually accomplished by spacing a plurality of bolts or other fastening devices around the gasket. For practical purposes, both the gasket and the opposing flanges must be designed and constructed out of sufficiently sturdy material so as to support the compression loads necessary to perfect the seal. As a result, the flange members tend to be heavily constructed, thereby adding to overall weight and cost.

U.S. Pat. No. 5,687,975 to Inciong, issued Nov. 18, 1997, describes a gasketed sealing assembly whose objective is to minimize the number of clamping bolts needed to establish an adequate compressive load between opposing flanges. While the Inciong '975 patent represents a noteworthy advance in the art, it nevertheless remains dependent upon maintaining some compressive load between the opposing flanges to maintain a fluid tight seal. Thus, the flanges must be constructed of sufficiently sturdy (and heavy) material to withstand the compression loads.

A more recent example of a prior art attempt to reduce the compression load requirements between opposing flanges may be found in U.S. Publication No. 2006/0118073 to Bauer et al., published Jun. 8, 2006. This technique, while effective, may be considered expensive and not suited for all applications. In this design, the gasket feature is molded directly to one of the flange portions. The gasket member is of elastomeric construction with an embedded stabilizing core made of a rigid plastic material that increases lateral contact pressure on the opposing flange.

Accordingly, there exists a need in this field for a stand-alone gasket such as that used in a three-part system comprising the gasket and a pair of opposing flanges which are sealed together against the passage of liquid without compressing the flanges together. The stand-alone nature of the gasket component reduces overall system cost and facilitates low-cost repairs and maintenance. Therefore, a solution is needed that will enable light-weight flange constructions due to the avoidance of compressive loads. The solution must be low-cost, versatile, durable and easily adapted from one application to the next.

SUMMARY OF THE INVENTION

In accordance with a first aspect of this invention, a stand-alone, loose piece gasket is provided for sealing a pair of opposing flanges together against the passage of liquid without compressing the flanges together. The gasket comprises an elongated elastomeric gasket body defining a generally continuous length. The gasket body includes an integral first sealing member extending in a first lateral direction relative to the length, and an integral second sealing member extending in a second lateral direction opposite to the first lateral direction. Each of the first and second sealing members extend continuously and uninterrupted along the length of the gasket body. A first pair of opposing beads protrudes laterally from the first sealing member. The first opposing pair of beads extends continuously and uninterrupted along the length of the gasket for establishing a laterally directed contact seal against a first one of the opposing flanges. A second pair of opposing beads protrudes laterally from the second sealing member. The second opposing pair of beads extends continuously and uninterrupted along the length of the gasket for establishing a laterally directed contact seal against a second one of the opposing flanges. An elongated reinforcing spring is embedded within the gasket body and extends within each of the first and second sealing members. The reinforcing spring has at least one U-shaped bend for continuously urging the respective first and second pairs of beads laterally relative to the length to enhance the contact pressure of the beads against their respective opposing flanges. By this construction, the gasket maintains a fluid impervious seal between the opposing flanges through self-generated lateral contact pressure on each of the flanges without compressive force.

According to a second aspect of the invention, a three-part gasket system is provided for sealing a pair of opposing flanges together against the passage of liquid without compressing the flanges together. The three-part system consists of an elongated elastomeric body, along with first and second flanges. The elongated elastomeric gasket body defines a generally continuous length. The first and second flanges extend parallel to the gasket body, and each have a pair of oppositely facing contact faces. The gasket body includes an integral first sealing member extending laterally toward the first flange, and an integral second sealing member extending laterally toward the second flange. Each of the first and second sealing members extend continuously and uninterrupted along the length of the gasket body. A first pair of opposing beads protrudes laterally from the first sealing member. The first opposing pair of beads extends continuously and uninterrupted along the length for establishing laterally directed contact seals against the respective contact faces of the first flange. Likewise, the second pair of opposing beads is similarly structured and establishes a laterally directed contact seal against the respective contact faces of the second flange. An elongated reinforcing spring is embedded within the gasket body and extends within each of the first and second sealing members. The reinforcing spring has at least one U-shaped bend for continuously urging the respective first and second pairs of beads laterally relative to the length so as to enhance the contact pressure of the beads against the respective contact faces of the first and second flanges. The gasket maintains a liquid impervious seal between the first and second flanges through self-generated lateral contact pressure on each of the respective contact faces.

According to yet another aspect of the invention, a method is provided for maintaining a sealed interface between a pair of opposing flanges without compressing the flanges together. According to the method, first and second flanges are provided, each having a pair of oppositely facing contact faces. An elongated elastomeric body is interposed between the first and second flanges. A first pair of opposing beads on the gasket body bears in lateral pressing contact against the respective contact faces of the first flange. And likewise, a second pair of opposing beads on the gasket body bear in lateral pressing contact against the respective contact faces of the second flange. An elongated reinforcing spring is embedded within the gasket body and backs each of the first and second pairs of beads. The improvement is characterized by increasing the lateral contact pressure between the second pair of beads and the respective contact faces on the second flange in direct response to laterally displacing the reinforcing spring in the region of the first beads. This occurs simultaneously with the step of increasing the lateral contact pressure between the first pair of beads and the respective contact faces in the first flange in direct response to laterally displacing the reinforcing spring in the region of the second beads. Thus, according to the claimed method, the gasket maintains a liquid impervious seal between the first and second flanges through self-generated lateral contact pressure on each of the respective contact faces.

In accordance with each aspect of this invention, the shortcomings and disadvantages inherent in prior art approaches and teachings are overcome.

BRIEF DESCRIPTION OF THE DRAWINGS

These and other features and advantages of the present invention will become more readily appreciated when considered in connection with the following detailed description and appended drawings, wherein:

FIG. 7 is a cross-sectional view as in FIG. 4, but illustrating a first alternative embodiment of the subject gasket assembly; and FIG. 8 is a cross-sectional view as in FIG. 4, but illustrating a second alternative embodiment of the subject gasket assembly.

DETAILED DESCRIPTION OF THE PREFERRED EMBODIMENT

Figure 1:
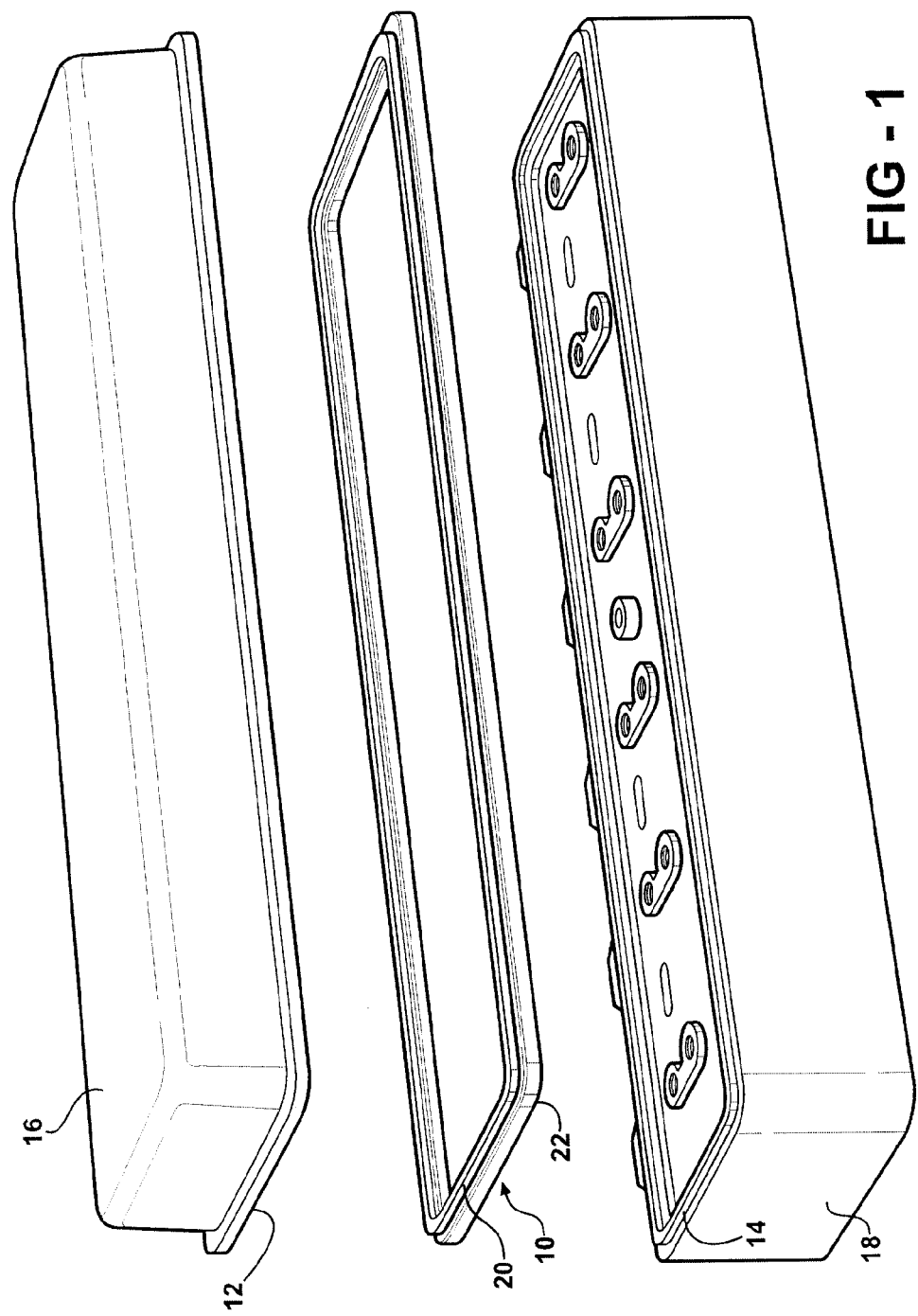
FIG. 1 is an exploded perspective view depicting an exemplary application of the subject invention in the form of an engine cylinder head, valve cover and valve cover gasket forming a three-part sealing assembly.

Referring to the Figures, wherein like numerals indicate like or corresponding parts throughout the several views, a sealing assembly according to the subject invention is exemplified in FIG. 1 comprising a gasket, generally indicated at 10, interposed between a first flange 12 and a second flange 14. Although a gasket assembly according to this invention may find usefulness in a variety of applications, the exemplary embodiment described here portrays use in an automotive environment where the first flange 12 comprises the lower, peripheral edge of a valve or rocker cover 16. The second flange 14 is here shown forming the upper peripheral edge of a cylinder head 18. Of course, these specifically-named components are merely examples, and those of skill in the art will appreciate other components, both within and outside of the field of vehicular engines, with which to apply the teachings of this invention.

The gasket 10 as depicted in FIG. 1 is formed as a continuous, i.e., looping or endless, member. In many applications, this form will be considered the norm. However, it is foreseeable that the gasket 10 may be of similar elongated construction yet have definite ends. In either event, the elongated, extrusion-like nature of the gasket body consistently defines a generally continuous length.

Figure 2:
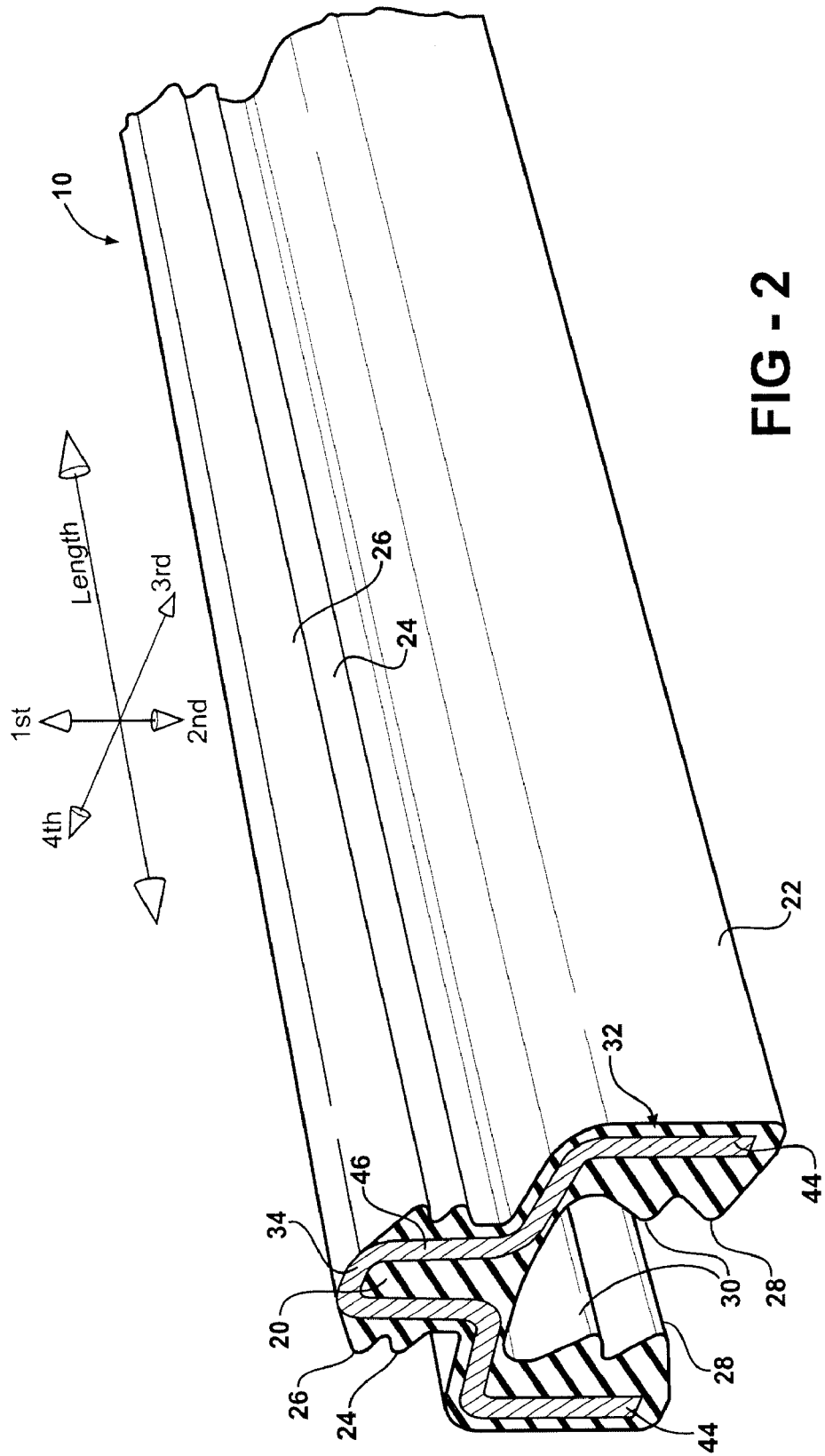
FIG. 2 is a fragmentary perspective view of a stand alone gasket according to a preferred embodiment of the subject invention.

Referring now to FIG. 2, the length of the gasket 10 is established by the elongated body of the gasket 10 and indicated by a descriptive legend adjacent the drawing figure. The gasket body is here shown including an integral first sealing member 20 extending in a first lateral direction relative to the length. In this example, the first lateral direction is depicted as an upward pointing vector. All directional references, such as "lateral," are relative to the length of the gasket body. Likewise, an integral second sealing member 22 extends in a second lateral direction that is generally opposite to the first lateral direction. Thus, in the example of FIG. 2, the second lateral direction is represented by a downwardly directed vector. Each of the first 20 and second 22 sealing members extend continuously and uninterrupted along the length of the gasket body. Thus, the gasket 10 maintains a generally consistent cross-section along its entire length, which length may be either endless or definite.

A first pair of opposing beads 24 protrude laterally from the first sealing member 20. The lateral directions referred to here in relation to the beads 24 comprises third and fourth lateral directions. These third and fourth lateral directions are represented as vectors in FIG. 2 that are generally perpendicular to the first and second lateral directions. The first pair of opposing beads 24 extend continuously and uninterrupted along the length of the gasket body for establishing a laterally directed contact seal against the first flange 12. Thus, the first pair of beads 24 takes the form of ribs, or ridges, extending the entire length of the gasket 10. In addition to the first pair of beads 24, supplemental first beads 26 can be added, as needed. Thus, supplemental first beads 26 are optional and can be included in as many pairs and arrangements as may be appropriate for a given application. The supplemental beads 26, like the first pair of beads 24 may or may not extend the continuous length of the gasket 10 and may be provided for enhanced sealing, enhanced retention, or other purposes.

A second pair of opposing beads 28 protrude laterally from the second sealing member 22. Like the first pair of beads 24, the second pair of beads 28 also face in the third and fourth lateral directions. By referring to the first 24 and second 28 pairs of beads as "opposing," it is meant that the beads 24, 28 face in laterally opposite directions, i.e., the third and fourth lateral directions. In the case of the first pair of beads 24, they are depicted as facing laterally away from or outwardly relative to one another. However, in the case of the second pair of opposing beads 28, they are shown facing toward or inwardly relative to one another. In addition to the second pair of beads 28, supplemental beads 30 can be provided for the same purposes as that described above in connection with the first pair of supplemental beads 26. That is, the second pair of supplemental beads 30 may or may not be continuous and uninterrupted along the length of the gasket 10, and may be provided for enhanced sealing, enhanced grip, locating purposes, or other useful objectives.

Preferably, the gasket 10 is made from a highly elastic, elastomeric material such as rubber. The term "rubber" is used in a more generic sense to refer to any compressible and highly resilient elastomeric material. More generally, however, any material known and used for gasketing applications can be used for the gasket 10, provided it is elastomeric.

An elongated, reinforcing spring, generally indicated at 32, is embedded within the elastomeric gasket body. The reinforcing spring 32 is preferably a unitary, sheet-like strip of metallic spring material like high carbon steel or other highly resilient alloy. The reinforcing spring 32 is shaped so as to extend within each of the first 20 and second 22 sealing members, backing the respective first 24 and second 28 pairs of opposing beads. The reinforcing spring 32 may be shaped in various configurations, but includes at least one U-shaped bend 34 for continuously urging the respective first 24 and second 28 pairs of opposing beads laterally (i.e., third and fourth dimensions) relative to the length of the gasket 10. This lateral urging caused by the bent reinforcing spring 32 enhances the contact pressure of the beads 24, 28 against their respective opposing flanges 12, 14, respectively. Through the strategic shape and embedment of the reinforcing spring 32, the gasket 10 is enabled to maintain a liquid impervious seal between the opposing flanges 12, 14 through self-generated lateral contact pressure on each of the flanges 12, 14 without requiring compressive force to be maintained between the flanges 12, 14. Thus, the structural composition of one or both flanges can be lightened since there are no, or minimal, compressive loads to sustain.

Figure 4:
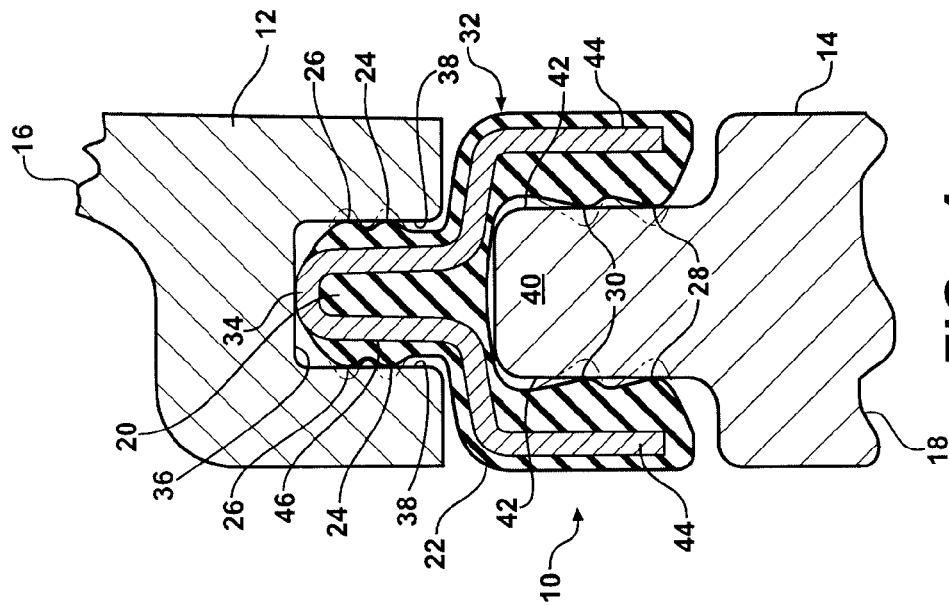
FIG. 4 is a cross-sectional view of a gasket assembly according to a preferred embodiment of the subject invention.
Figure 3:
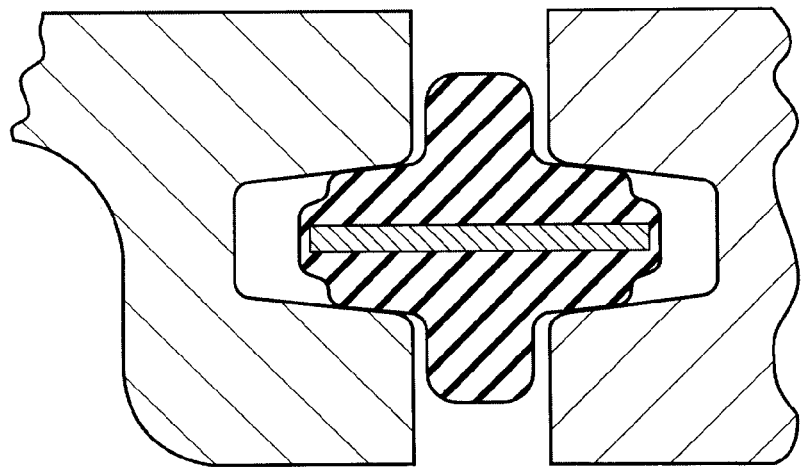
FIG. 3 is a representational cross-sectional view of a prior art gasket construction compressed between opposing flanges.

A side-by-side comparison of the subject gasket 10 and a prior art construction adapted for a similar application can be readily observed by reference to FIGS. 3 and 4. A preferred embodiment of the subject gasket 10, as illustrated in FIG. 4, mates with the first flange 12 which is formed as a continuously extending trough 36 with a pair of oppositely facing contact faces 38 presenting laterally toward one another on opposing sides of the trough 36. The second flange 14, on the other hand, is defined by a continuously extending tongue 40 with a pair of oppositely facing contact faces 42 presenting laterally away from one another on opposite sides of the tongue 40. In this case, the gasket body, as viewed in cross-section, possesses an inverted Y-shaped configuration with the first sealing member 21 inserted into the trough 36 and the second sealing member 22 having a generally U-shaped configuration overlapping both sides of the tongue 40. As here shown, the resilient spring 32 likewise has a generally Y-shaped configuration, as viewed in cross-section taken perpendicularly through the length of the gasket 10. This Y-shaped configuration of the resilient spring 32 is defined by a pair of diverging legs 44 embedded within the second sealing member 22 and a confluent stem 46 embedded within the first sealing member 20. The U-shaped bend 34 spoken of previously is contained at the apex of the stem 46, i.e., adjacent the upper most edge of the gasket 10. In this configuration, it is shown that the first pair of opposing beads 24 protrudes laterally away from one another so as to engage the contact faces 38 in a lateral direction. The second pair of opposing beads 28 protrudes laterally toward one another, and are adapted for directly engaging the contact faces 42 of the tongue 40.

Figure 6:
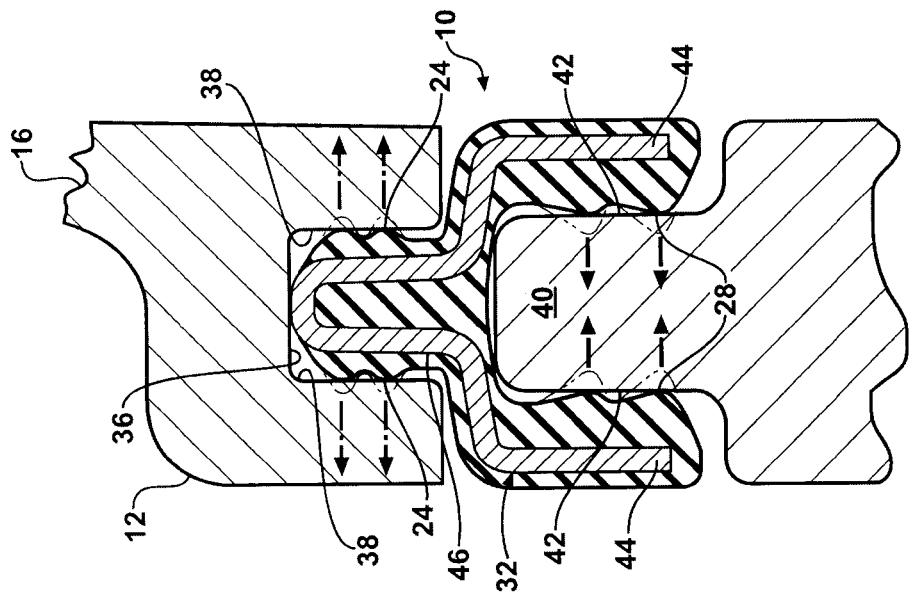
FIG. 6 is a cross-sectional view depicting through imaginary force vectors the increase in lateral contact pressure exerted by each of the beads as a result of the reinforcing spring displacement shown in FIG. 5.
Figure 5:
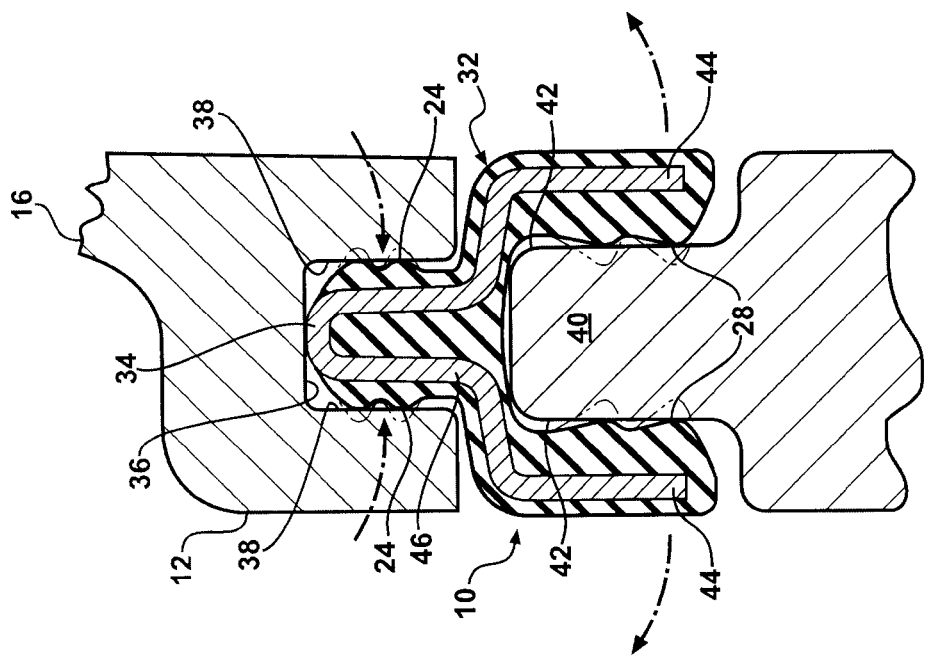
FIG. 5 is a cross-sectional view as in FIG. 4 depicting the multi-directional displacement of the embedded reinforcing spring caused by the shaped interfaces of the opposing first and second flanges.

In operation, the gasket 10 is dimensioned so as to provide an interference fit relationship between the respective beads 24, 28 and their respective contact faces 38, 42 on the flanges 12, 14. Thus, as shown in FIG. 5, when the first sealing member 20 is inserted into the trough 36 in the first flange 12, the interference fit between the first pair of beads 24 and the contact faces 38 displaces the stem 46 portion of the reinforcing spring 32, thus squeezing it together as indicated by the imaginary directional arrows. Thus, with the U-shaped bend 34 acting somewhat like a living hinge, the diverging legs 44 are squeezed together, resulting in a seal reaction force as depicted in FIG. 6, wherein the second pair of beads 28 are squeezed ever more tightly against their respective contact faces 42 on the tongue 40. A symbiotic relationship is established between the forced displacement of the reinforcing spring 32 associated with the first flange 12 that improves the sealing characteristics at the interface with the second flange 14. In like manner, attachment of the second sealing member 22 to the tongue 40 displaces the diverging legs 44 of the reinforcing spring 32 outwardly, as depicted by directional arrows in FIG. 5, due to the interference fit between the second pair of beads 28 and the contact faces 42. This, in turn, urges a spreading of the stem 46 via the hinge-like U-shaped bend 34. The result, as depicted in FIG. 6, is a laterally outwardly directed seal reaction force tending to more tightly press the first pair of beads 24 (along with any supplemental beads 26) more tightly against the contact faces 38 in the trough 36. Thus, the unique construction of the subject gasket 10 with the embedded reinforcing spring 32, coupled with the novel construction of the first 12 and second 14 flanges, results in a gasket 10 better adapted to maintain a liquid impervious seal between the first 12 and second 14 flanges through self-generated lateral contact pressure on each of the respective contact faces 38, 42.

Turning now to FIG. 7, a first alternative embodiment of the subject gasket 110 is shown and described. In this first alternative embodiment, reference numbers similar to those used above are offset by 100 and re-used to identify corresponding features for convenience. In this embodiment, the shape of the first sealing member 120 is mirrored with that of the second sealing member 122, such that the resulting cross-sectional shape of the gasket 110 resembles the letter "H." In this design, the reinforcing spring 132 is composed of first and second disjointed halves, each half containing a U-shaped bend 134 in the center connecting portion of the gasket body. The shape of the first flange 112 is modified accordingly, and now takes a form identical to that of the second flange 114 for proper mating with the configuration of this alternative gasket 110. In all other respects, the gasket 110 functions the same as that described above in connection with the preferred embodiment.

FIG. 8 depicts a second alternative embodiment to the subject invention. In this example, in which reference numbers consistent with that of the preferred embodiment are offset by 200, the second flange 214 has been modified to mirror that of the first flange 212. Likewise, the second sealing member 222 of the gasket 210 mirrors the first sealing member 220, developing a cross-sectional configuration of the gasket 210 in the shape of a plus (+) sign. In this example, the reinforcing spring 232 is again formed in first and second halves one half each serving the first 220 and second 222 sealing members. The U-shaped bend 234 of each half of the reinforcing spring 232 is positioned near the apex, as in the preferred embodiment. Portions of the respective reinforcing spring halves may be bent in laterally outward directions (third and fourth dimensions) to stiffen the body of the gasket or otherwise enhance functionality as needed.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A gasket for sealing a pair of opposing flanges together against the passage of liquid without compressing the flanges together, said gasket comprising:

an elongated elastomeric gasket body defining a generally continuous length;

said gasket body including an integral first sealing member extending in a first lateral direction relative to said length, and an integral second sealing member extending in a second lateral direction generally opposite to said first lateral direction, each of said first and second sealing members extending continuously and uninterrupted along said length of said gasket body;

a first pair of opposing beads protruding laterally from said first sealing member, said first opposing pair of beads extending continuously and uninterrupted along said length for establishing a laterally directed contact seal against a first one of the opposing flanges;

a second pair of opposing beads protruding laterally from said second sealing member, said second opposing pair of beads extending continuously and uninterrupted along said length for establishing a laterally directed contact seal against a second one of the opposing flanges;

and an elongated reinforcing spring embedded within said gasket body and extending within each of said first and second sealing members, said reinforcing spring having at least one U-shaped bend for continuously urging said respective first and second pairs of beads laterally relative to said length to enhance the contact pressure of said beads against their respective opposing flanges, whereby said gasket maintains a liquid impervious seal between the opposing flanges through self-generated lateral contact pressure on each of the flanges without compressive force;

said resilient spring having a generally Y-shaped configuration as viewed in cross-section taken perpendicularly through said length; and said generally Y-shaped configuration of said resilient spring being defined by a pair of diverging legs embedded within said second sealing member and a confluent stem embedded within said first sealing member, said U-shaped bend contained within said stem, said first pair of opposing beads protruding laterally away from one another and said second pair of opposing beads protruding laterally toward one another.

2. The gasket of claim 1 wherein said first and second pairs of opposing beads protrude in third and fourth lateral directions relative to said length and generally perpendicular to said first and second lateral directions.

3. The gasket of claim 1 wherein said resilient spring comprises a unitary strip having a continuous cross-section along said length.

4. The gasket of claim 3 wherein said resilient spring is fabricated from a metallic material.

5. A gasket system comprising:

an elongated elastomeric gasket body defining a generally continuous length;

a first flange extending parallel to said gasket body, said first flange having a pair of oppositely facing contact faces;

a second flange extending parallel to said gasket body and opposing said first flange, said second flange having a pair of oppositely facing contact faces;

said gasket body including an integral first sealing member extending laterally toward said first flange, and an integral second sealing member extending laterally toward said second flange, each of said first and second sealing members extending continuously and uninterrupted along said length of said gasket body;

a first pair of opposing beads protruding laterally from said first sealing member, said first opposing pair of beads extending continuously and uninterrupted along said length for establishing laterally directed contact seals against said respective contact faces of said first flange;

a second pair of opposing beads protruding laterally from said second sealing member, said second opposing pair of beads extending continuously and uninterrupted along said length for establishing a laterally directed contact seals against said respective contact faces of said second flange;

and an elongated reinforcing spring embedded within said gasket body and extending within each of said first and second sealing members, said reinforcing spring having at least one U-shaped bend for continuously urging said respective first and second pairs of beads laterally relative to said length to enhance the contact pressure of said beads against the respective said contact faces of said first and second flanges, whereby said gasket maintains a liquid impervious seal between said first and second flanges through self-generated lateral contact pressure on each of the respective said contact faces;

said resilient spring having a generally Y-shaped configuration as viewed in cross-section taken perpendicularly through said length; and said first flange being defined by a continuously extending trough with said pair of oppositely facing contact faces presenting laterally toward one another on opposing sides of said trough, and said second flange being defined by a continuously extending tongue with said pair of oppositely facing contact faces presenting laterally away from one another on opposite sides of said tongue, and further said generally Y-shaped configuration of said resilient spring being defined by a pair of diverging legs embedded within said second sealing member and a confluent stem embedded within said first sealing member, said U-shaped bend contained within said stem, said first pair of opposing beads protruding laterally away from one another and said second pair of opposing beads protruding laterally toward one another.

6. The gasket system of claim 5 wherein said first and second pairs of opposing beads protrude in third and fourth lateral directions relative to said length and generally perpendicular to said first and second lateral directions.

7. The gasket system of claim 5 wherein said resilient spring comprises a unitary strip having a continuous cross-section along said length.

8. The gasket system of claim 7 wherein said resilient spring is fabricated from a metallic material.

* * * * *